United States Patent [19]
Yoda

[11] Patent Number: 5,890,173
[45] Date of Patent: Mar. 30, 1999

[54] INFORMATION PRINT APPARATUS AND METHOD

[75] Inventor: Nobuhisa Yoda, Kawasaki, Japan

[73] Assignee: Kabushiki Kaisha Toshiba, Kanagawa-ken, Japan

[21] Appl. No.: 752,811

[22] Filed: Nov. 20, 1996

[30] Foreign Application Priority Data

Nov. 24, 1995 [JP] Japan .................................. 7-305957

[51] Int. Cl.⁶ ........................... G06K 15/00; G06F 15/00
[52] U.S. Cl. ......................... 707/501; 707/525; 395/114
[58] Field of Search .................................. 707/500, 501, 707/513, 514, 515, 525, 909, 517, 522, 523, 526, 527; 395/113–114, 117

[56] References Cited

U.S. PATENT DOCUMENTS 5,297,249 3/1994 Bernstein et al. ...................... 345/356
5,745,360 4/1998 Leone et al. ............................. 707/513
5,781,914 7/1998 Stork et al. .......................... 707/501 X Primary Examiner—Joseph H. Feild
Attorney, Agent, or Firm—Limbach & Limbach L.L.P.

[57] ABSTRACT

There is provided a print apparatus which prints a plurality of pieces of linked document information of those that are distributed to and stored in a plurality of external document servers. The apparatus includes an extraction unit for extracting link information indicating second document information, which is linked to first document information, from the first document information received from the corresponding document server, a second reception unit for receiving the second document information indicated by the extracted link information from the corresponding document server, a print unit for assigning serial page numbers to the first document information and the second document information, and printing the first document information and the second document information, and a recurring information detection unit for detecting that the already printed second document information is linked again to the first document information. Hypermedia documents are printed in the form that it is easy for the user to use.

11 Claims, 13 Drawing Sheets

INFORMATION INDEX

BASE INFORMATION: INFORMATION 0

INFORMATION 1...PAGE #10
INFORMATION 2...PAGE #15
INFORMATION 3...PAGE #19*
 *(ACCESS MANAGEMENT
   INFORMATION ONLY)

TOTAL PAGE COUNT: 20 PAGES
   (INCLUDING INDEX)

INFORMATION PRINT APPARATUS AND METHOD

BACKGROUND OF THE INVENTION

1. Field of the Invention

The present invention relates to an information print apparatus and method for printing information of a digital document such as a hypermedia document, or the like.

2. Description of the Related Art

In recent years, with the spread of computers and network environments, more documents are created and managed in offices not as orthodox paper documents but as digital documents using wordprocessors or the like. Digital documents used in such environment offer new application methods that utilize convenient features unlike orthodox paper documents.

For example, hypermedia documents built on World Wide Webs (WWWs) using, e.g., the Internet are stored at different locations in units of information topics in a plurality of document servers that are distributed on the network and operate independently. More specifically, unlike in a conventional method that linearly manages an information group like a conventional paper document in units of "pages", information is managed nonlinearly. In order to look up hypermedia documents, a user acquires information by connecting to document servers corresponding to required "topics", and prepares the entire document on the user's side. For example, in an on-demand print method which is receiving a lot of attention in recent years, information corresponding to a user's request is read out from each document server, and is printed in the order requested by the user.

Upon printing document information such as wordprocessor documents which are stored in one or a plurality of files, a document is printed by designating pages, and is not linked with other documents. WWW hypermedia documents and the like are separately stored in units of topics, as described above, and only a required topic is printed upon request.

More specifically, since paper documents are linearly managed by a sequence of page numbers, and hypermedia documents are nonlinearly managed by links among topics, printing a hypermedia document is a conversion from nonlinear information to linear information.

FIG. 14 is a functional block diagram showing the module arrangement associated with such digital document print apparatus. More specifically, this print apparatus is constituted by a user input unit 90, an information storage unit 91, a link information management unit 92, an information reception unit 94 which is connected to a network line 8 and receives information from an external document server, a link information extraction unit 95, a print buffer memory 96, and a print unit 97 which has a page number management unit (not shown) and controls the print buffer memory 96. The print unit 97 informs a printer 98 of the presence of printable information in the print buffer memory 96, and the printer 98 prints the information.

The print operation in the digital document print apparatus with the above arrangement will be described below with reference to the flow chart shown in FIG. 15.

The information reception unit 94 forms a message as a transmission request of stored information with respect to the storage location of document information input and designated by the user input unit 90, and transmits the message via the network line 8. The information reception unit 94 waits until the requested document information is transmitted. Upon reception of the information, the information reception unit 94 transfers the received information to the information storage unit 91, which informs the print unit 97 that the new information is stored.

The print unit 97 writes the document information in the print buffer memory 96 in units of print pages, and assigns page numbers. The print unit 97 informs the printer 98 of the presence of printable information in the print buffer memory 96, and the printer 98 prints information for one page stored in the print buffer memory 96.

Upon completion of printing up to the last page, the page number management unit of the print unit 97 resets the page number to 0, and ends processing.

When a digital document is to be processed in such network environment, the user reads out some pieces of information associated with desired topics and selectively prints them upon looking up nonlinearly managed information distributed on the network.

However, when the print apparatus prints information by tracking links among those pieces of information, there are a very large number of information links including links to identical, recurring information, and hence, such print method may often pose a problem.

For example, when information which is being displayed is to be printed, the Mosaic software as a popular WWW viewer prints only an "information page" (corresponding to the above-mentioned topic) which is read out at that time, but does not print another information page to which this information page is linked. When the user wants to print another information page, he or she must display the information and determine whether or not he or she wants to print the displayed information.

When nonlinearly stored information is converted into linear information, and the converted information is printed, the print order may often pose a problem. That is, the converted linear information may be printed in an inappropriate order, and may have contents which are not easy to understand. On the other hand, identical information may recur upon tracking information links, and paper sheets may be wasted if information is printed in every such occasions. Furthermore, an access error to information may often lead to a print instruction error, and cannot often be reflected in the print result.

SUMMARY OF THE INVENTION

It is, therefore, an object of the present invention to provide an information print apparatus and method, which can print a hypermedia document in a format that a user can easily use.

In order to achieve the above object, according to one aspect of the present invention, there is provided a method of printing a plurality of pieces of related document information which are distributed to and stored in a plurality of storage means in predetermined units, comprising: the step of designating a print operation of desired first document information; the step (ST2) of reading out the designated first document information from the corresponding storage means; the step (ST5) of searching for second document information which relates to the readout first document information; the step (ST6) of reading out the found second document information from the corresponding storage means; the step (ST10) of assigning information indicating a relationship between documents to the first document information and the second document information; the step (ST13) of printing the first document information and the second document information together with the assigned information indicating the relationship in accordance with the information indicating the relationship; and the step of inhibiting the second document information from being printed again when the already printed second document information relates again to the first document information, and printing only the information indicating the relationship assigned to the second document information when the second document information was printed previously.

According to another aspect of the present invention, there is provided a print apparatus for printing a plurality of pieces of linked document information which are distributed to and stored in a plurality of storage means in predetermined units, comprising: designation means (1) for designating a print operation of desired first document information; first reception means (5, ST2) for receiving the designated first document information from the corresponding storage means; extraction means (6) for extracting link information indicating second document information, which is linked to the first document information, from the received first document information; second reception means (5, ST6) for receiving the second document information indicated by the extracted link information from the corresponding storage means; means (10) for assigning serial page numbers to the first document information and the second document information; means (7, 18) for printing the first document information and the second document information together with the page numbers; and means for, when the already printed second information is linked again to the first document information, inhibiting the second document information from being printed again, and printing only the page number assigned to the second document information when the second information was printed previously.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The preferred embodiments of the present invention will be described hereinafter with reference to the accompanying drawings.

Figure 1:
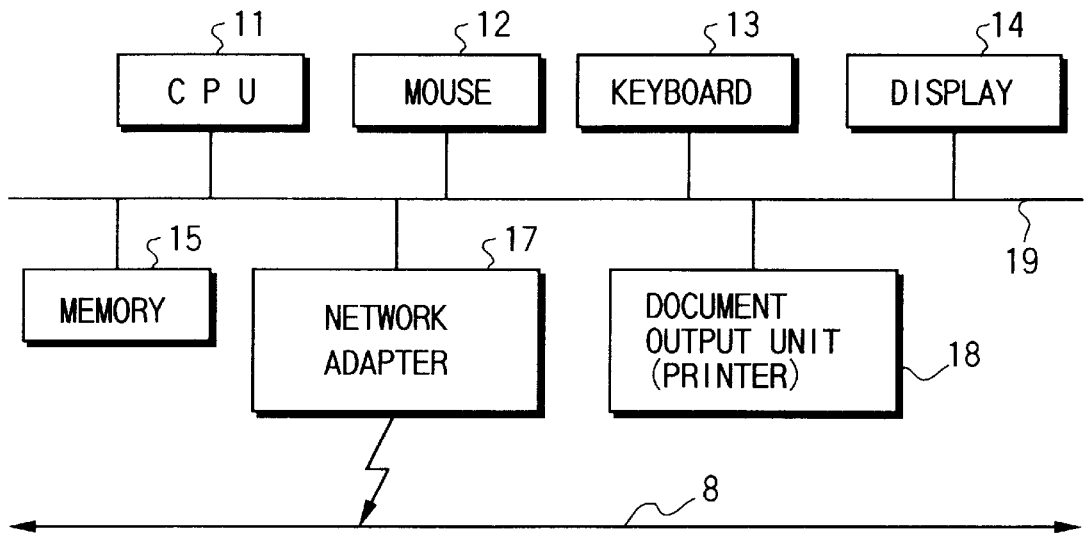
FIG. 1 is a schematic block diagram showing the arrangement of an information print apparatus according to the present invention.

FIG. 1 is a schematic block diagram showing the arrangement of an information print apparatus according to the present invention. More specifically, the information print apparatus is constituted by a CPU 11 for controlling the entire apparatus, a mouse 12 and a keyboard 13 which serve as input means, a display 14 serving as a display means, a memory 15 serving as a print buffer memory for temporarily storing an image and the like, a network adapter 17 connected to a network 8, and a document output unit 18 serving as a printer. A system bus 19 connects the CPU 11, the mouse 12, the keyboard 13, the display 14, the memory 15, the network adapter 17, and the printer 18.

Figure 2:
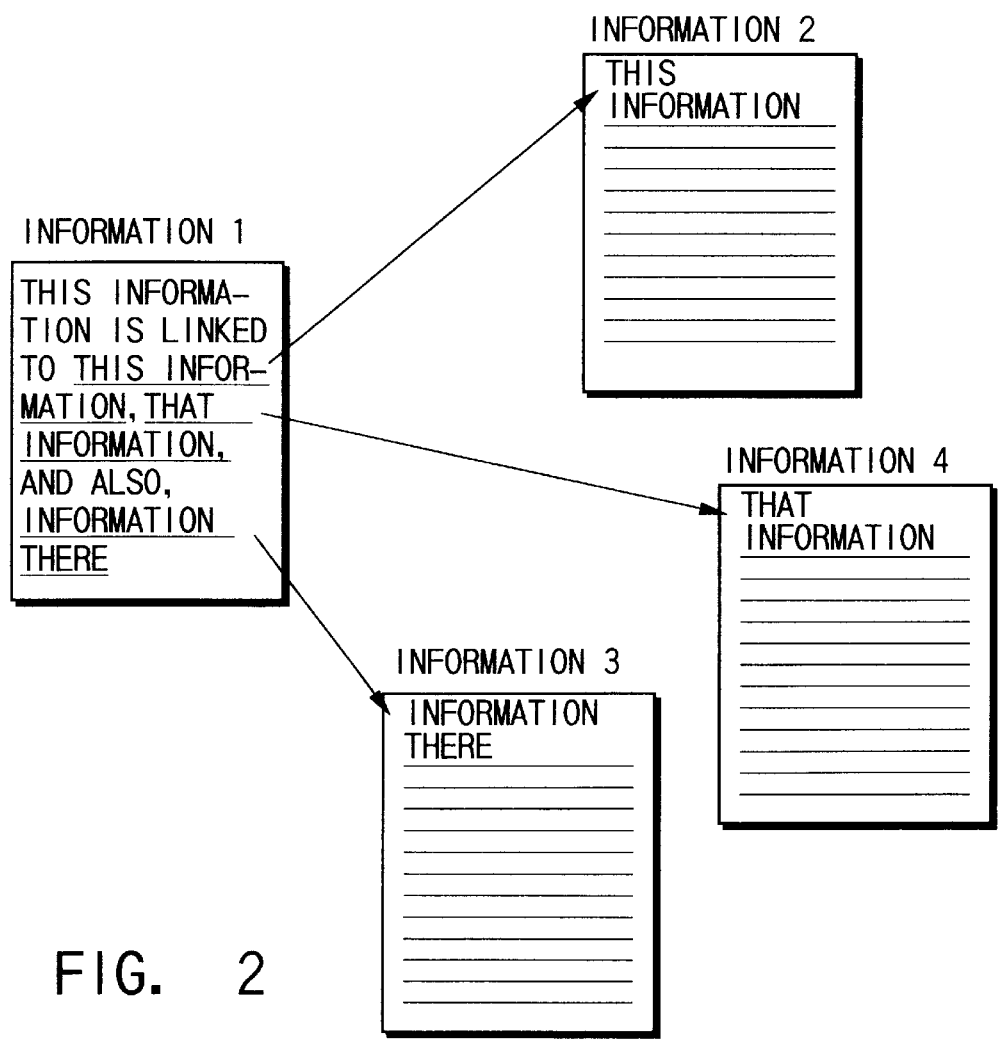
FIG. 2 is a view showing an example of the relationship among a plurality of pieces of linked document information.

FIG. 2 shows an example of the relationship among a plurality of pieces of linked document information (or information). As for four pieces of information stored in different locations, information 1 is linked to information 2, information 3, and information 4 in one way.

Figure 3:
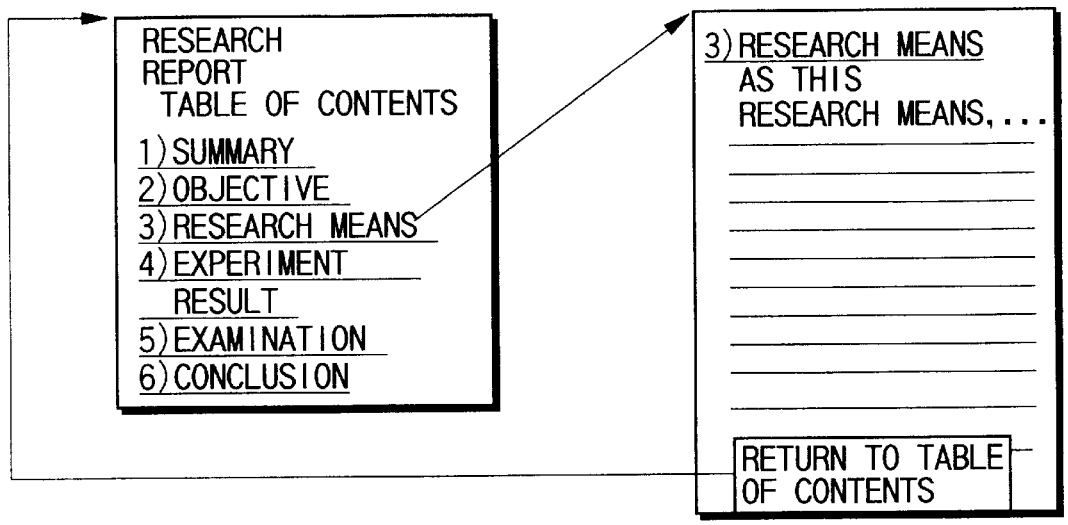
FIG. 3 is a view showing another example of the relationship among a plurality of pieces of linked document information.

FIG. 3 shows another example of the relationship among a plurality of pieces of linked document information. As shown in FIG. 3, when the table of contents of a research report and the contents of "research means" as the third chapter of the report are stored in different locations, the table of contents and document data stored in another location are linked in two ways. More specifically, when the two pieces of information have the above-mentioned relationship therebetween, the table of contents and the information of the third chapter can be accessed in two ways by tracking the link.

Figure 4:
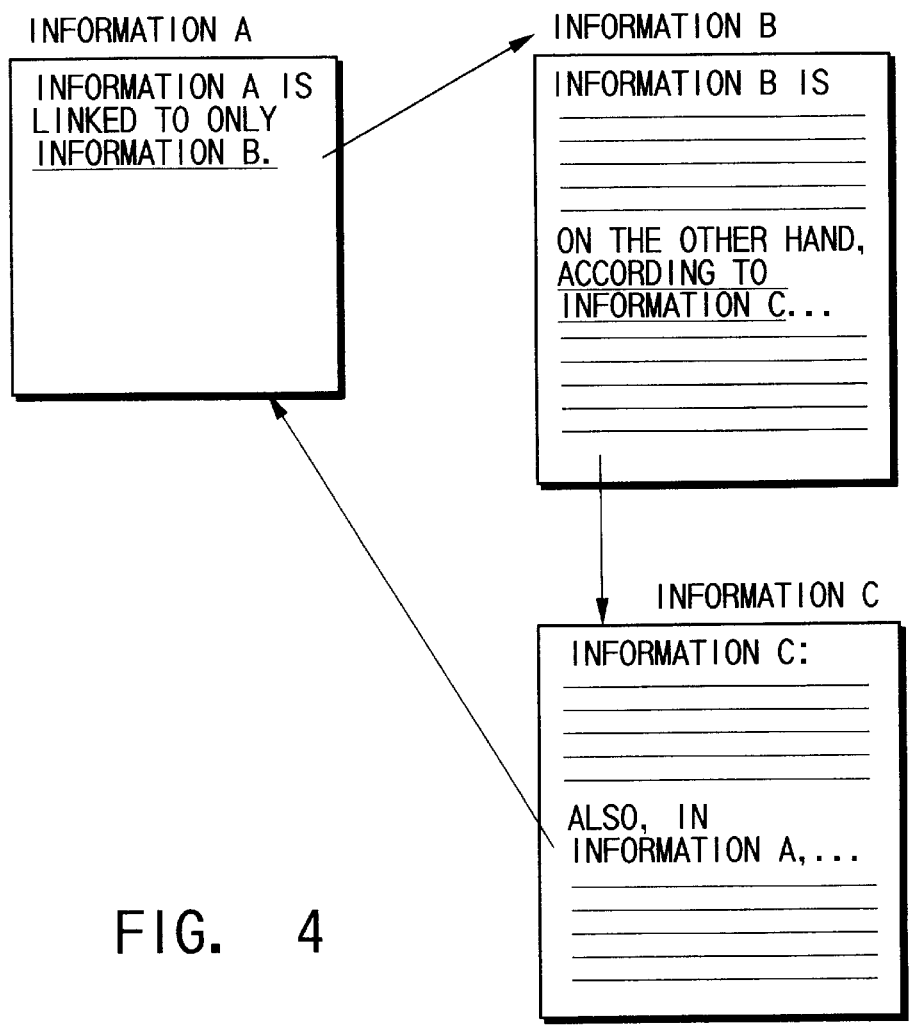
FIG. 4 is a view showing still another example of the relationship among a plurality of pieces of linked document information.

FIG. 4 shows a case wherein there are three pieces of information, i.e., information A, information B, and information C, the information A is linked to the information B, the information B is linked to the information C, and the information C is linked to the information A.

Figure 5:
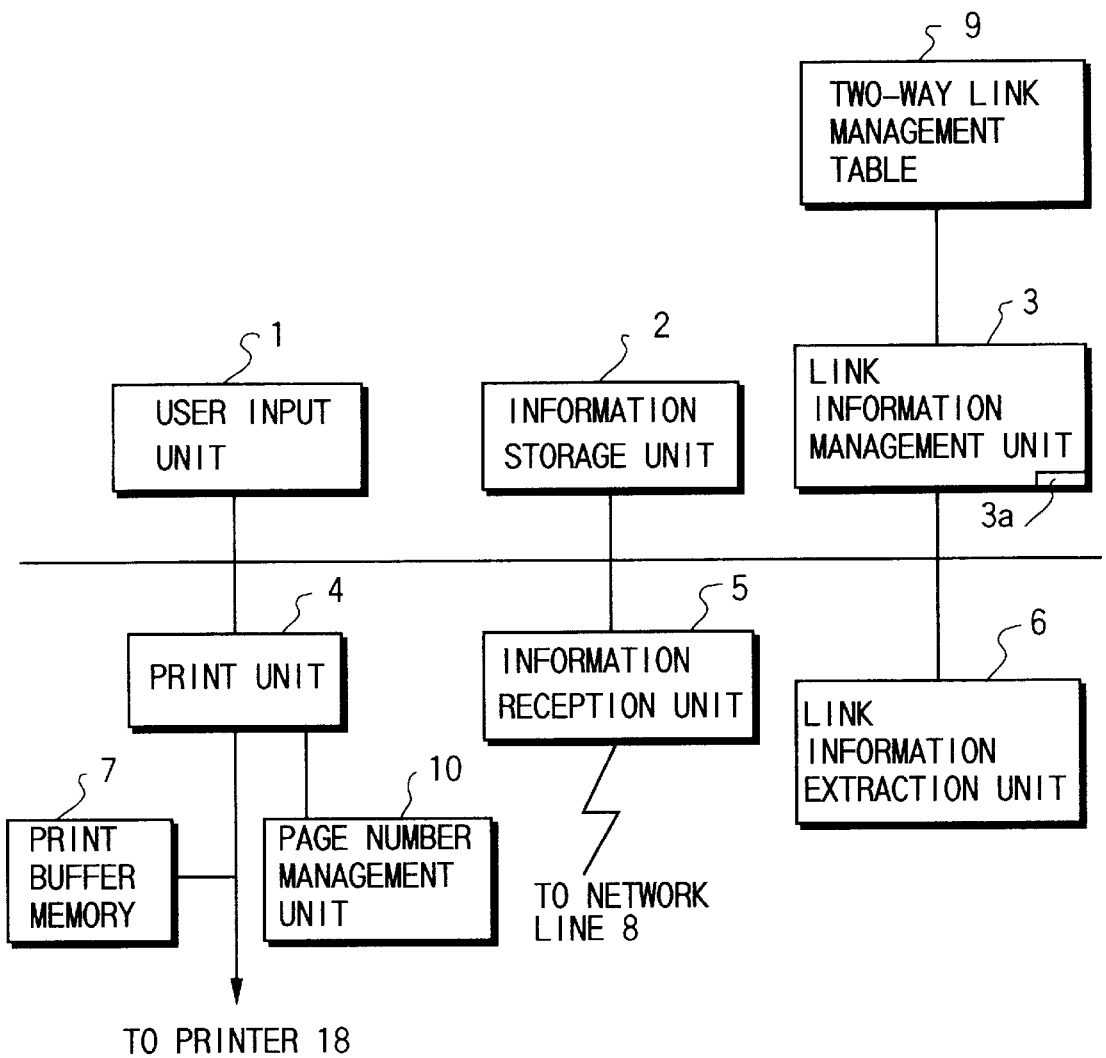
FIG. 5 is a block diagram showing the module arrangement of an information print apparatus according to an embodiment of the present invention.

FIG. 5 shows the module arrangement for printing some pieces of linked document information (including the contents of documents and link information) in the information print apparatus according to the present invention. More specifically, a user input unit 1 serves as an input means which is used by the user to specify document information to be printed, and to input commands for executing the print operation. An information storage unit 2 serves as a storage means for temporarily storing document information received from a device outside the apparatus. A link information management unit 3 manages link information extracted from the received information using a link destination information management table 3a and a two-way link management table 9.

A print unit 4 writes document information in a print buffer memory 7 in units of pages while inserting page numbers and the like upon printing the document information in the apparatus, and the stored information is output by the printer 18. An information reception unit 5 receives document information designated by the user or the link information management unit 3 from an external document server via the network 8. A link information extraction unit 6 analyzes the received document information, extracts information associated with a link, and transfers the extracted information to the link information management unit 3. A page number management unit 10 generates a new page number on the basis of the page number of the previously printed document information upon printing document information, and transfers the page number data to the print unit 4.

The user input unit 1 corresponds to the mouse 12, the keyboard 13, and the display 14; the information storage unit 2, the link information management unit 3, the print buffer memory 7, the two-way link management table 9, and the page number management unit 10 correspond to the memory 15; and the link information extraction unit 6, the print unit 4, and the information reception unit 5 correspond to the CPU 11 and the network adapter 17.

Figure 6A:
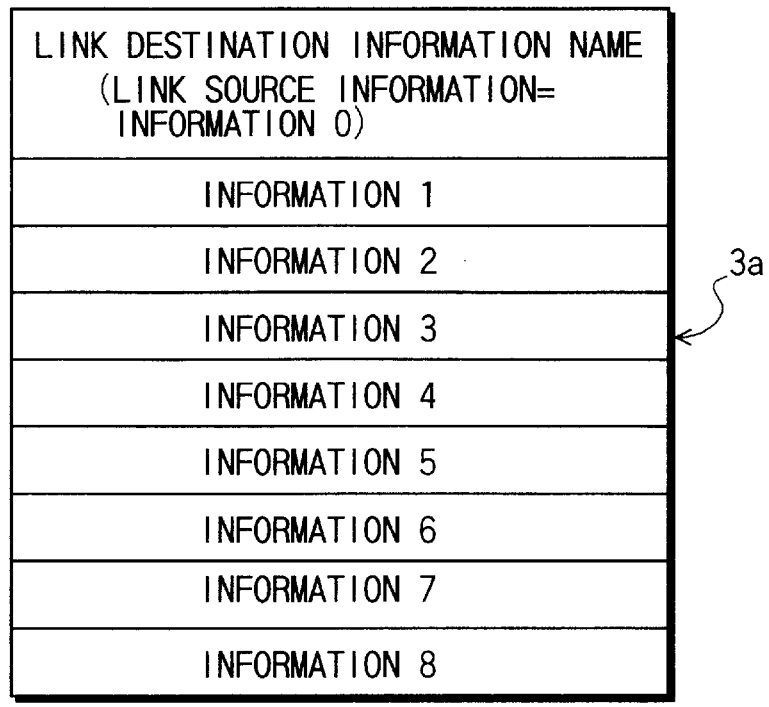
FIGS. 6A to 6C show management tables managed by a link information management unit.
Figure 6B:
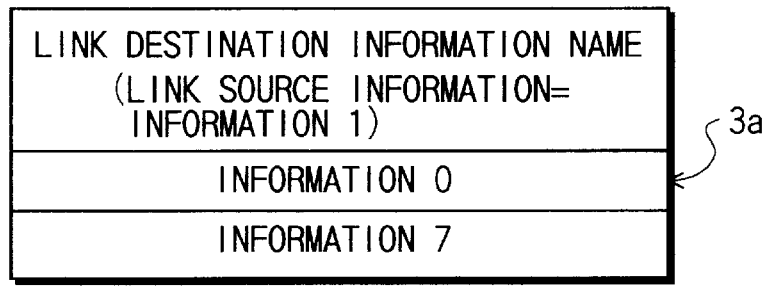
Figure 6C:
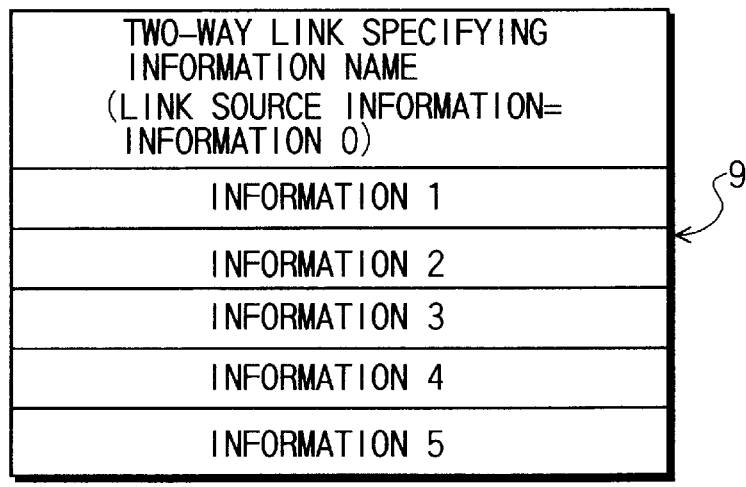

FIGS. 6A to 6C show management tables to be managed by the link information management unit 3. These management tables include the link destination information management tables 3a shown in FIGS. 6A and 6B, and the two-way link information management table 9 shown in FIG. 6C. Each link destination information management table 3a stores the document information names of link destinations of each document information. For example, FIG. 6B shows that the link destinations of information 1 are information 0 and information 7. On the other hand, FIG. 6C shows that there are a total of five pieces of document information, i.e., information 1 to information 5, which are linked to information 0 in two ways.

Figure 7A:
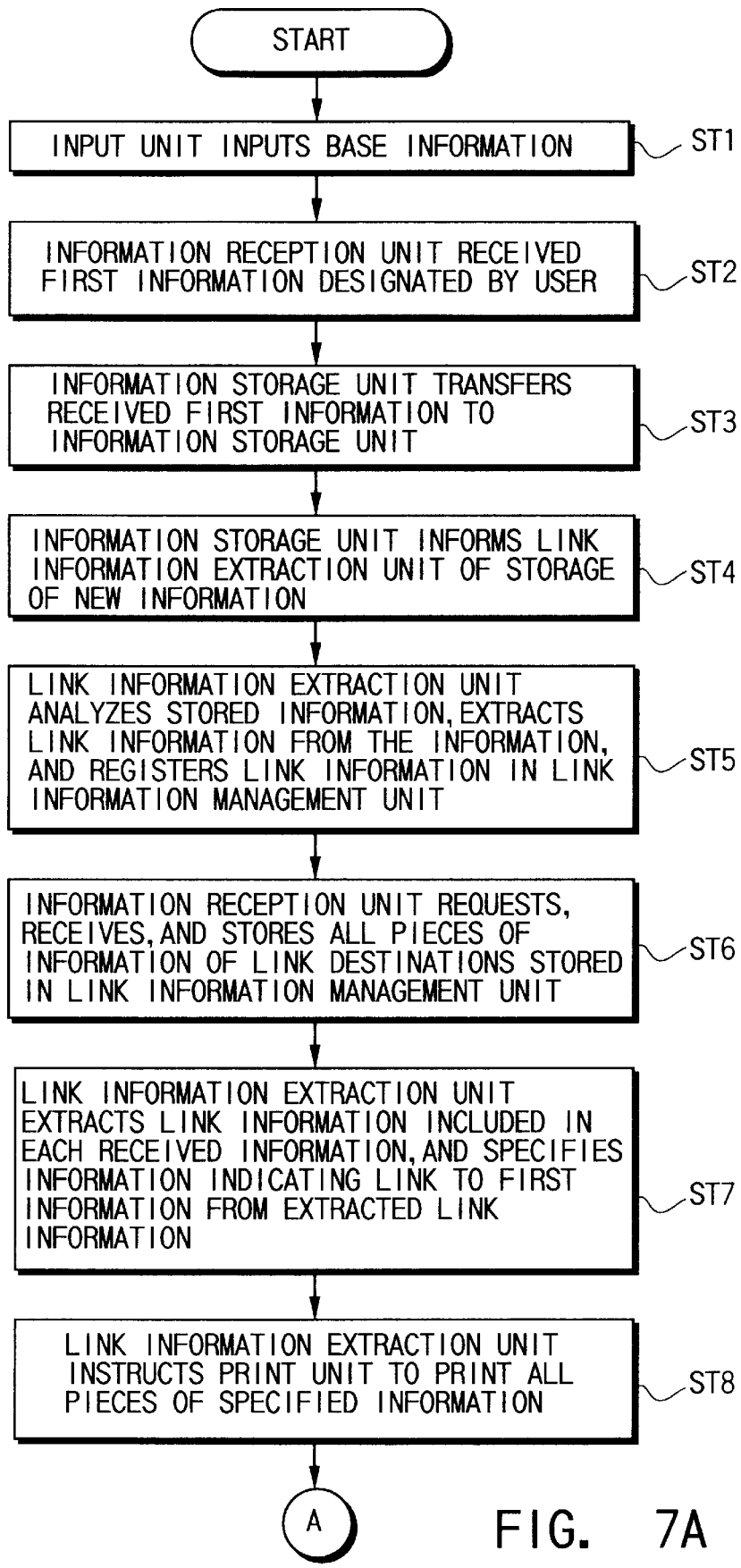
FIGS. 7A and 7B are flow chart for explaining the processing executed upon printing linked information.
Figure 7B:
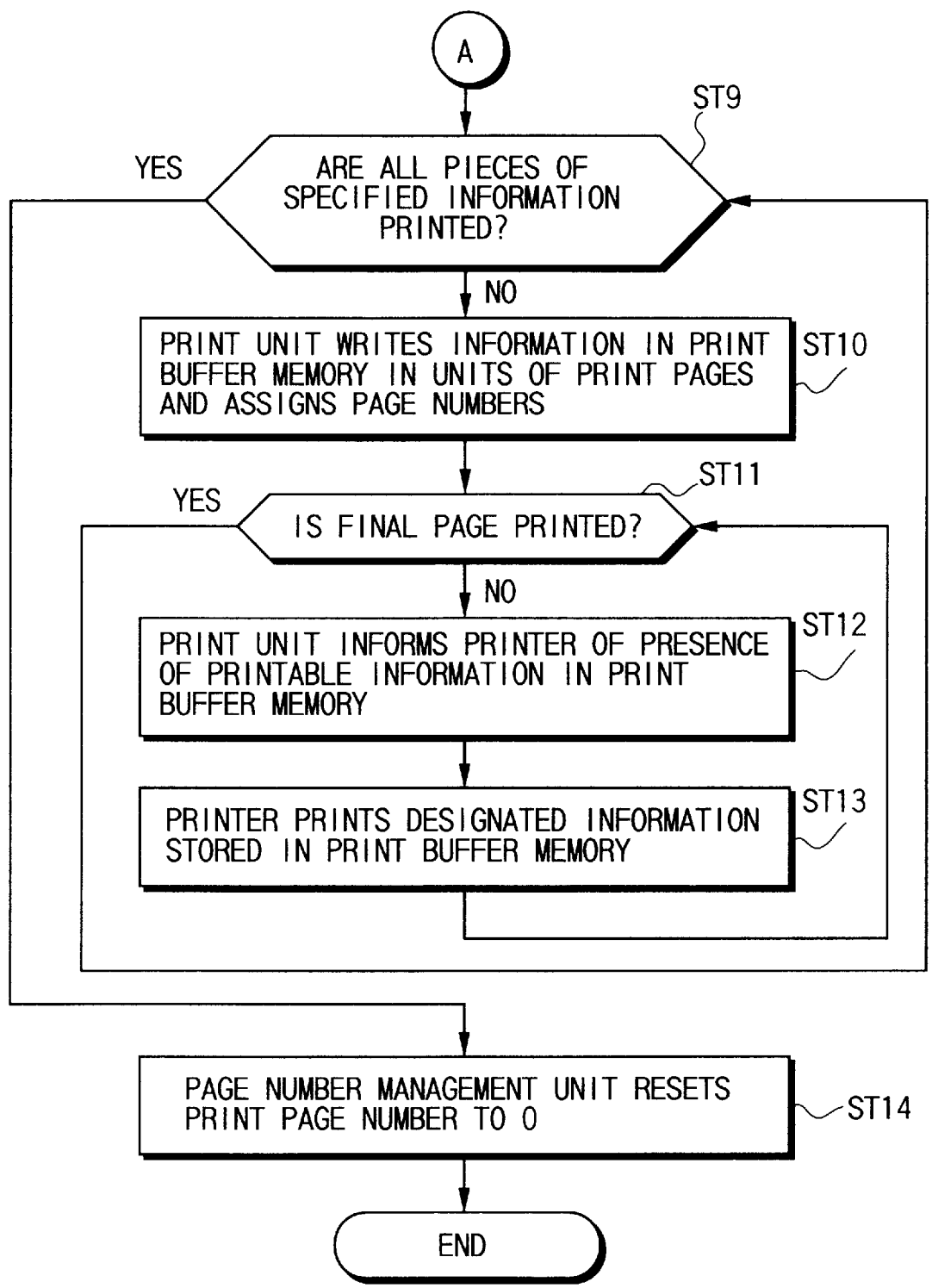

The processing executed upon printing linked document information in the above-mentioned arrangement will be explained below with reference to the flow chart in FIGS. 7A and 7B.

When the user designates first document information serving as a base document for the print operation via the user input unit 1 (ST1), the information reception unit 5 issues a transmission request of the first document information with respect to the storage location where the first document information is stored, and waits for reception of the information.

Upon reception of the first document information (ST2), the information reception unit 5 transfers the first document information to the information storage unit 2 (ST3). The information storage unit 2 temporarily stores the first document information, and informs the link information extraction unit 6 of reception of new document information (ST4). The link information extraction unit 6 analyzes the stored first document information, extracts, as link information, the name of another document information to which the first document information is linked, and registers the link information in the link destination information management table 3a of the link information management unit 3 (ST5). Note that the link information is bracketed between special symbols (e.g., HTML: hyper text transfer protocol), and the link information extraction unit 6 extracts information bracketed between the special symbols as link information.

Subsequently, the information reception unit 5 requests document information to the document information storage location of each link destination stored in the link destination information management table 3a in the link information management unit 3, receives the document information, and transfers the received document information to the information storage unit 2 (ST6). The information storage unit 2 temporarily stores such document information, and informs the link information extraction unit 6 of reception of new document information.

The link information extraction unit 6 extracts link information from the stored document information, and specifies link information indicating a link to the first document information as the base document (i.e., link information of document information which is linked to the first document information in two ways and forms a loop) (ST7), and registers the specified link information in the two-way link information management table 9 in the link information management unit 3. Also, the link information extraction unit 6 instructs the print unit 4 to print document information corresponding to the two-way link information registered in the two-way link information management table 9 (ST8) (if there is no document information which is linked to the first document information in two ways, the print operation is not performed).

The print unit 4 reads out document information stored in the information storage unit 2 by looking up the two-way link information management table 9, writes the readout information in the print buffer memory 7 in units of pages, and assigns page numbers to the respective pages (ST10). The print unit 4 informs the printer 18 of the presence of printable document information in the print buffer memory 7 (ST12). The printer 18 reads out information of the designated page from the printer buffer memory 7 and prints it out (ST13).

After all the pieces of specified document information are printed (ST9), the print unit 4 resets the print page number of the page number management unit 10 to 0 (ST14).

As described above, according to the present invention, when a plurality of pieces of document information which are linked to each other to have given document information as a base document are simultaneously printed out, document information which is linked to the base document information in two ways is specified, and only the specified document information is printed.

Figure 8:
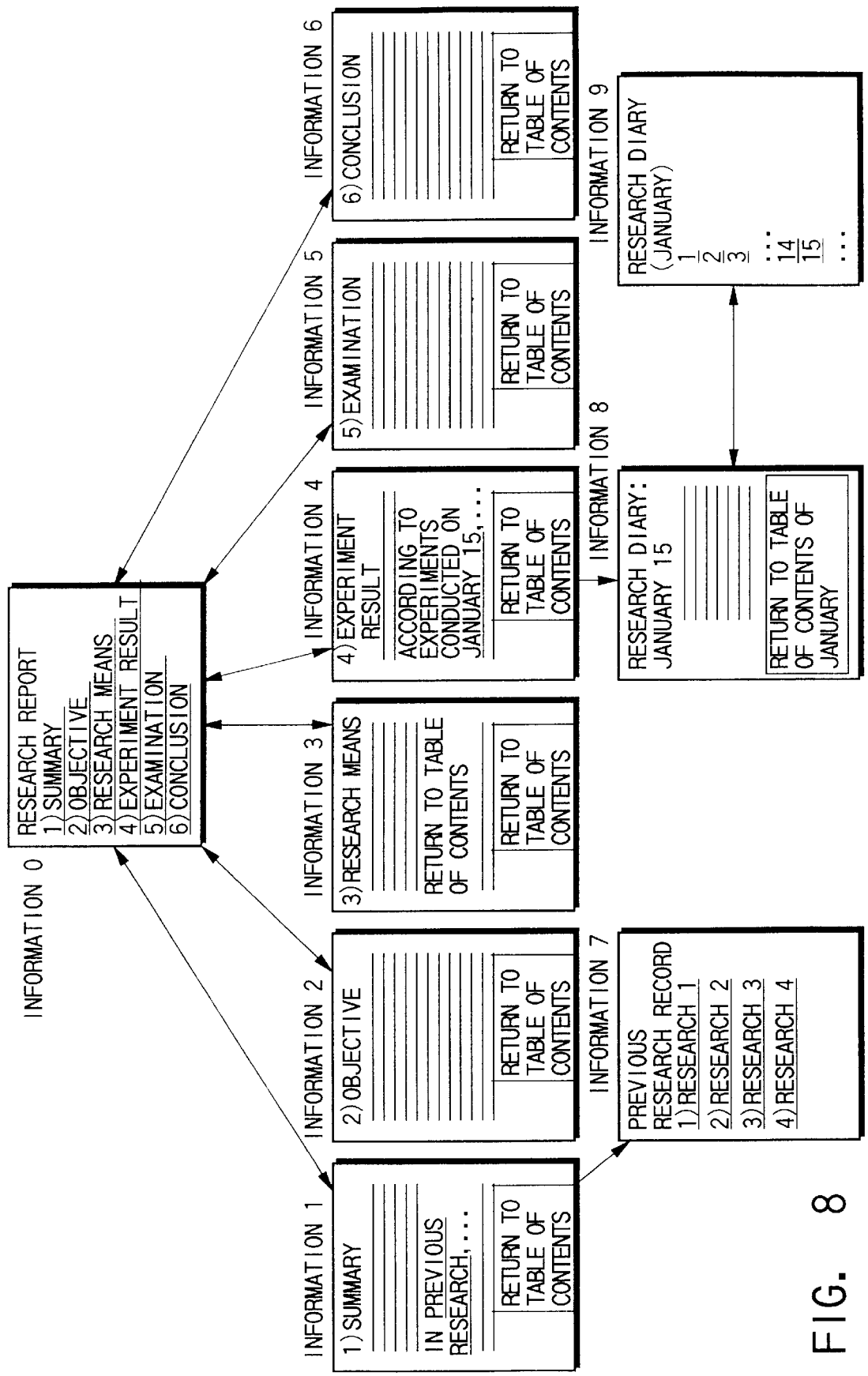
FIG. 8 is a view showing an example of a research report formed by linking a plurality of pieces of document information.

FIG. 8 shows an example of a research report formed by a plurality of pieces of linked document information. Information 1, information 2, information 3, information 4, information 5, and information 6 are linked to information 0 in two ways. When the user designates "information 0" that serves as both the cover and the table of contents of this research report as base document information and prints it, seven pieces of document information, i.e., information 0, information 1, information 2, information 3, information 4, information 5, and information 6 are printed out. More specifically, the document information of the cover & table of contents of the research report is printed simultaneously with the contents of "1) Summary" to "6) Conclusion". On the other hand, "Previous Research Record" (information 7)

and "Research Diary" (information 8) to which this base document information is linked are not printed since they are not linked in two ways.

Another embodiment of the present invention that relates to the print-out processing when links among document information are looped will be explained below.

In the example shown in FIG. 4, although the three pieces of document information are not directly linked to each other in two ways, the first document information appears after three links are tracked. Upon printing linked document information while tracking links, identical document information appears repetitively, and paper sheets may be wasted if such information is printed in every such cases.

Figures 9, 10:
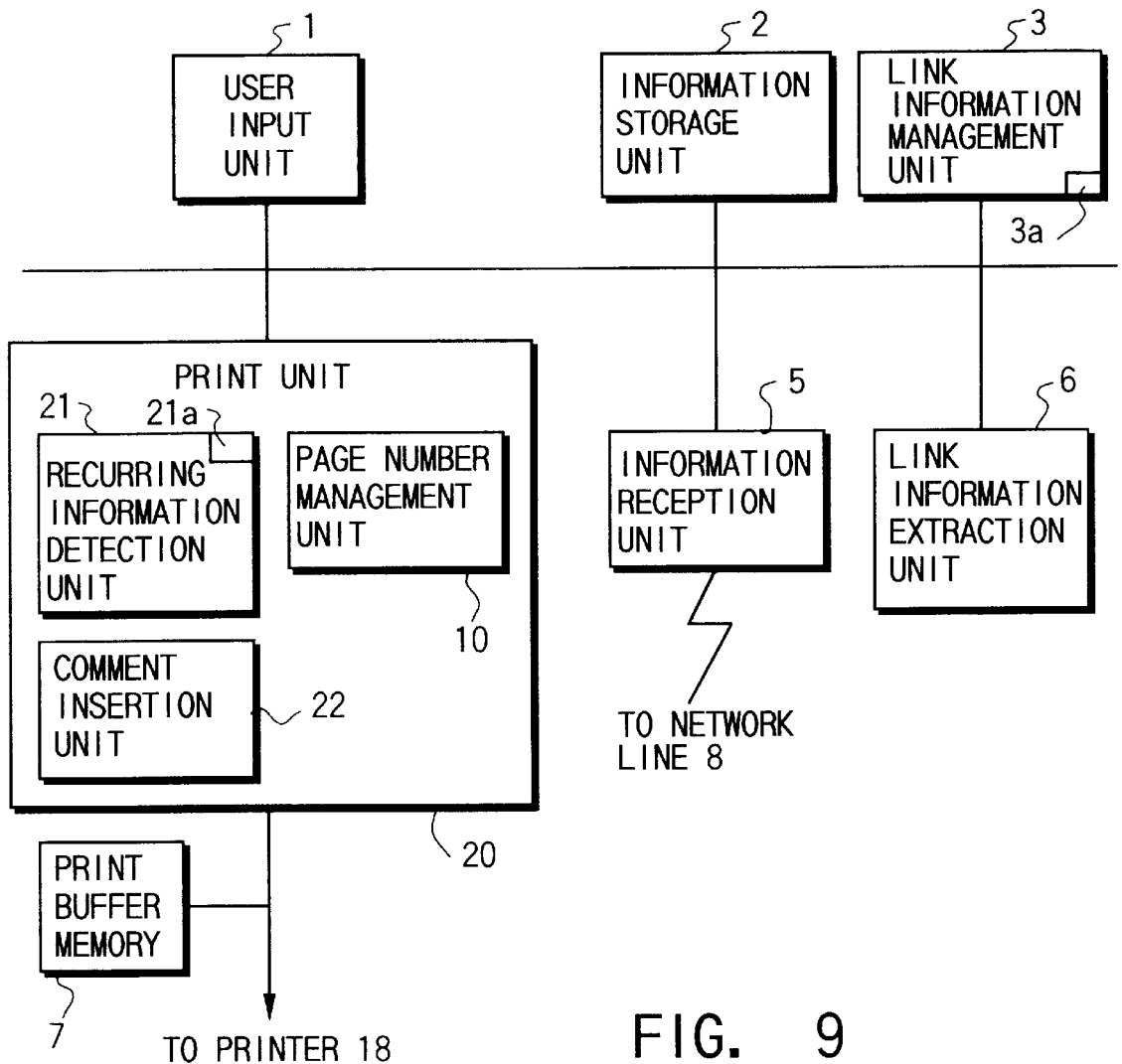
FIG. 9 is a block diagram showing the module arrangement of an information print apparatus according to another embodiment of the present invention.
FIG. 10 shows an information print history management table.

FIG. 9 shows the module arrangement of the apparatus which prints some pieces of electronic information which are linked to form a loop among document information. A user input unit 1, an information storage unit 2, a link information management unit 3, a link destination information management table 3a, an information reception unit 5, a link information extraction unit 6, a print buffer memory 7, a network 8, and a page number management unit 10 are the same as those in the module arrangement shown in FIG. 5 and are denoted by the same reference numerals as in FIG. 5, and a detailed description thereof will be omitted.

The difference from the above-mentioned arrangement shown in FIG. 5 is that a recurring information detection unit 21 and a comment insertion unit 22 are added to a print unit 20. The recurring information detection unit 21 manages the history of document information names printed by this apparatus and the print start page numbers as an information print history management table 21a, as shown in FIG. 10. Also, when instructions for printing identical document information are input, from the second time on the recurring information detection unit 21 detects such information, and supplies the print start page number upon printing the document information previously to the comment insertion unit 22 in place of printing the identical document information. The comment insertion unit 22 has a function of adding comment information to the printed page.

Figure 11:
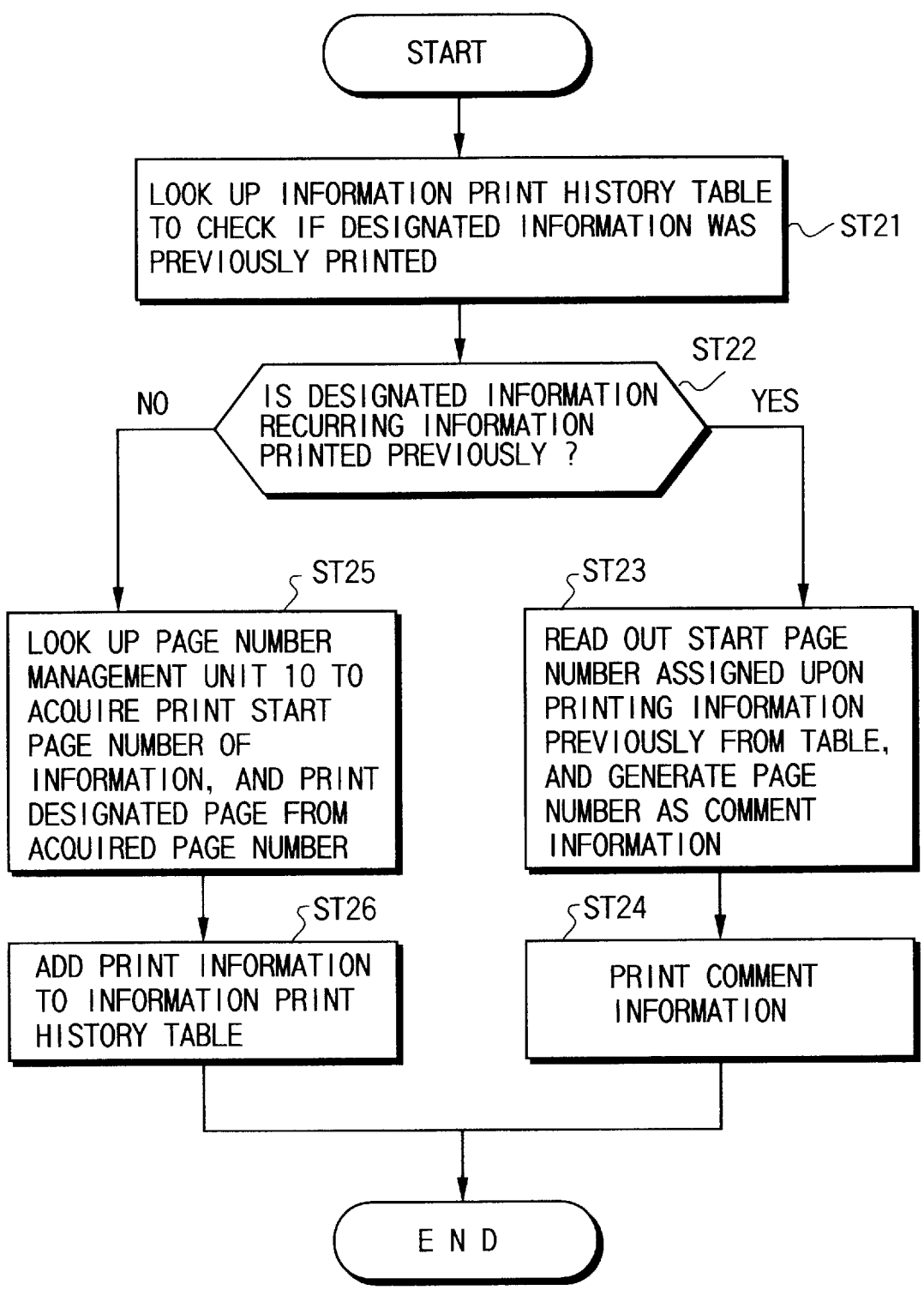
FIG. 11 is a flow chart for explaining the processing executed upon printing document information while excluding recurring information.

The processing executed upon printing document information while excluding recurring document information will be described below with reference to the flow chart shown in FIG. 11.

More specifically, when the print unit 20 receives a print instruction of document information, the recurring information detection unit 21 looks up the information print history management table 21a shown in FIG. 10 to confirm if the designated document information was previously printed (ST21).

If the document information is recurring information which was printed previously (ST22), the unit 21 reads out the print start page number upon printing the information previously, and transfers the document information name and the readout page number to the comment insertion unit 22 (ST23). The comment insertion unit 22 generates comment information such as "for information 0, please refer to page 1) or the like, and prints it (ST24).

On the other hand, if the designated document information is not included in the table (ST22), the unit 21 acquires the print start page number of this document information from the page number management unit 10, assigns page numbers based on the acquired page number, and prints the respective pages (ST25). Upon completion of printing, the unit 21 adds (updates) the information print history management table 21a, as show in FIG. 10 (ST26).

The right of access in the information print apparatus of the present invention will be described below.

Upon designating base document information, the user inputs information such as a user name that can specify the user, via the user input unit 1. The information reception unit 5 simultaneously transmits the information associated with the user who requested the document information when it requests the document information to the external document server. When an access violation to information has occurred (i.e., when the user is not granted permission to access the information), the information reception unit 5 receives, from the external document server, a message indicating this together with information of, e.g., an information manager and the like.

Upon reception of this message, the information reception unit 5 informs the information storage unit 2 that the access is denied. When the print unit 4 or 20 supplies a document information name to the information storage unit 2 to acquire the contents of the document information upon printing the document information, the information storage unit 2 informs the print unit 4 or that the access is denied, and supplies information associated with the manager of the document information and the like to the print unit 4 or 20. The print unit 4 or 20 prints the document information name, the message indicating that the access to the document information is denied, and information of the manager name, contact address, and the like of the document information.

Figure 13A:
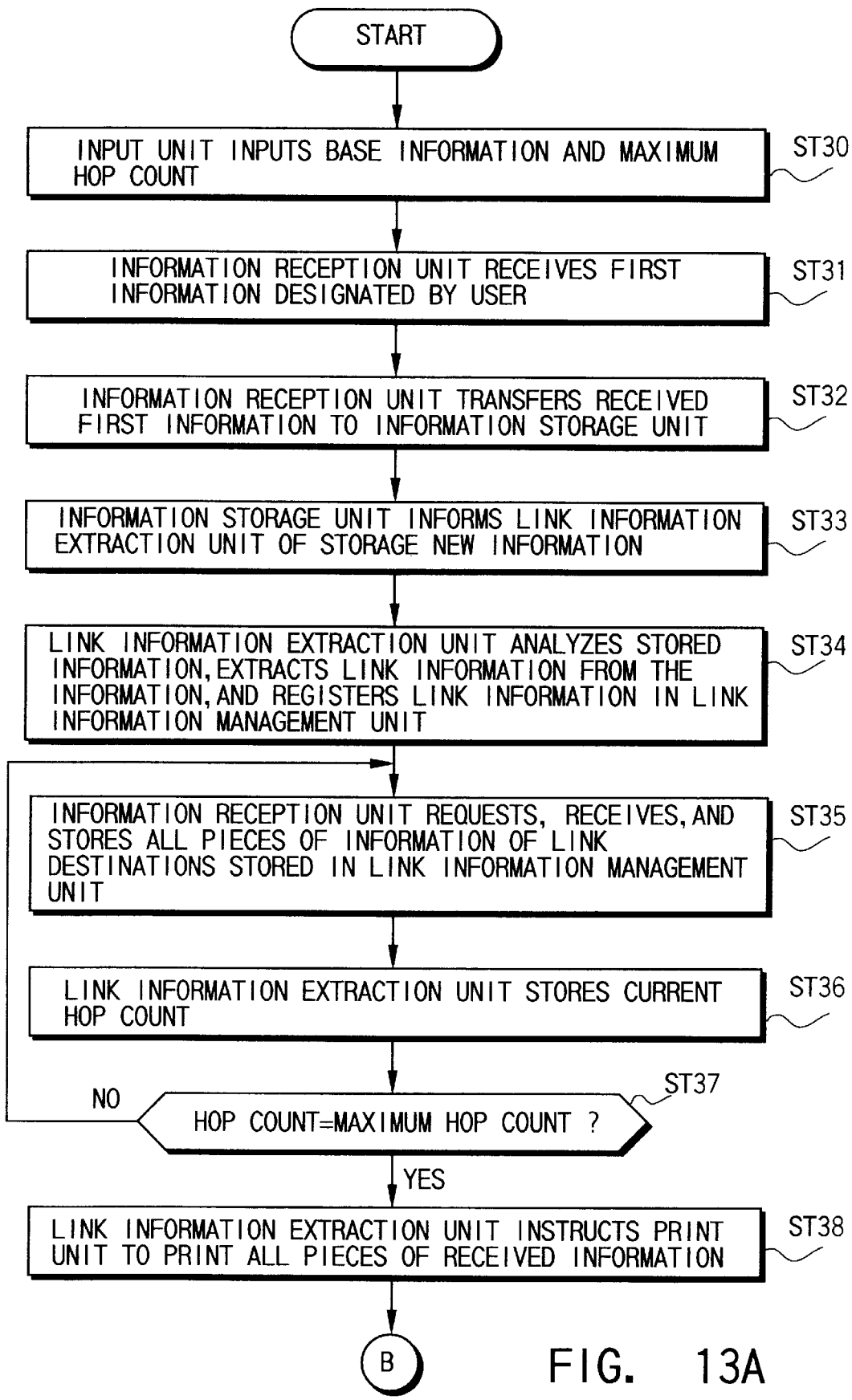
FIGS. 13A and 13B are flow chart showing the hop count management in the information print apparatus of the present invention.
Figure 13B:
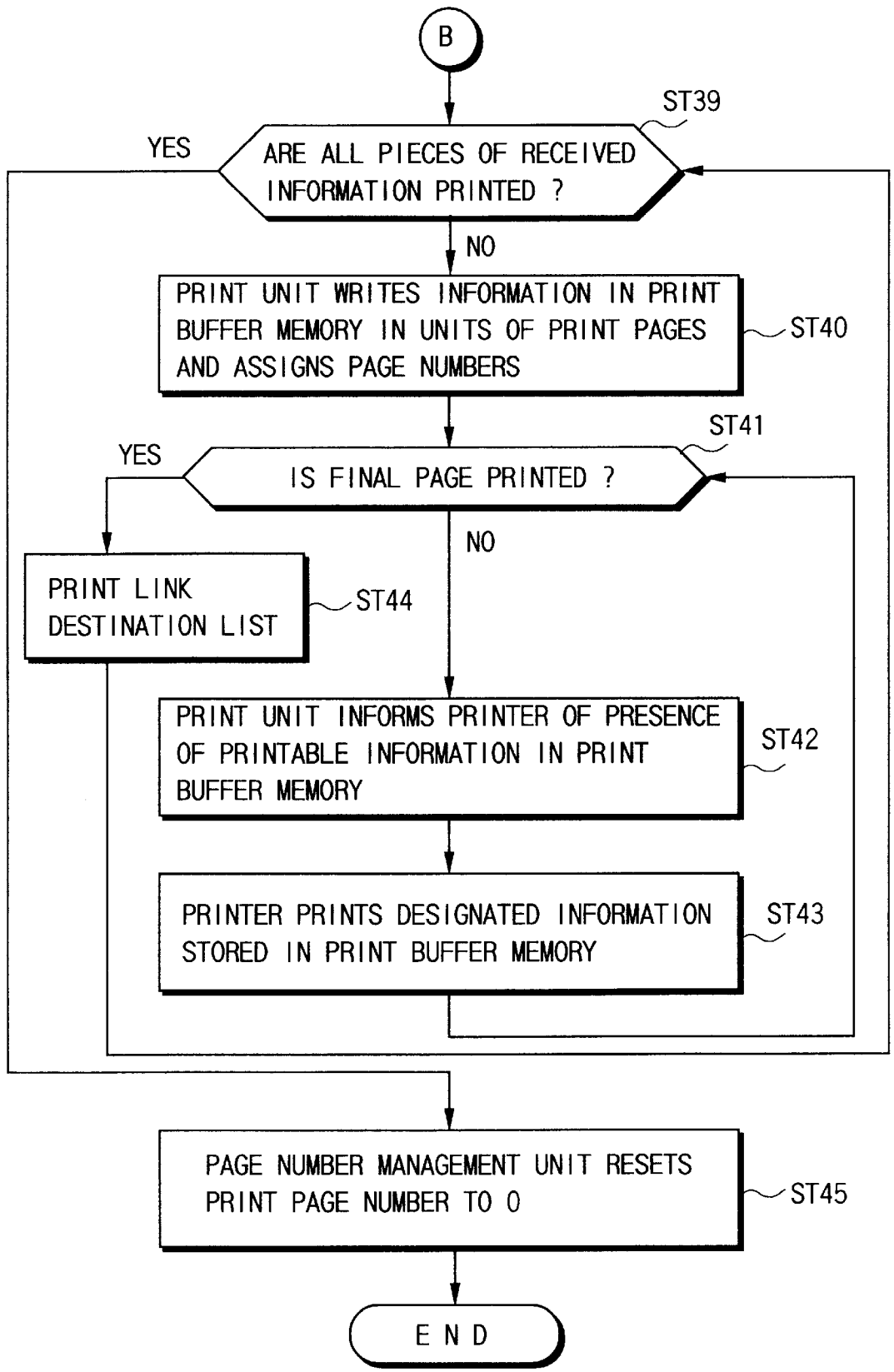
Figure 15:
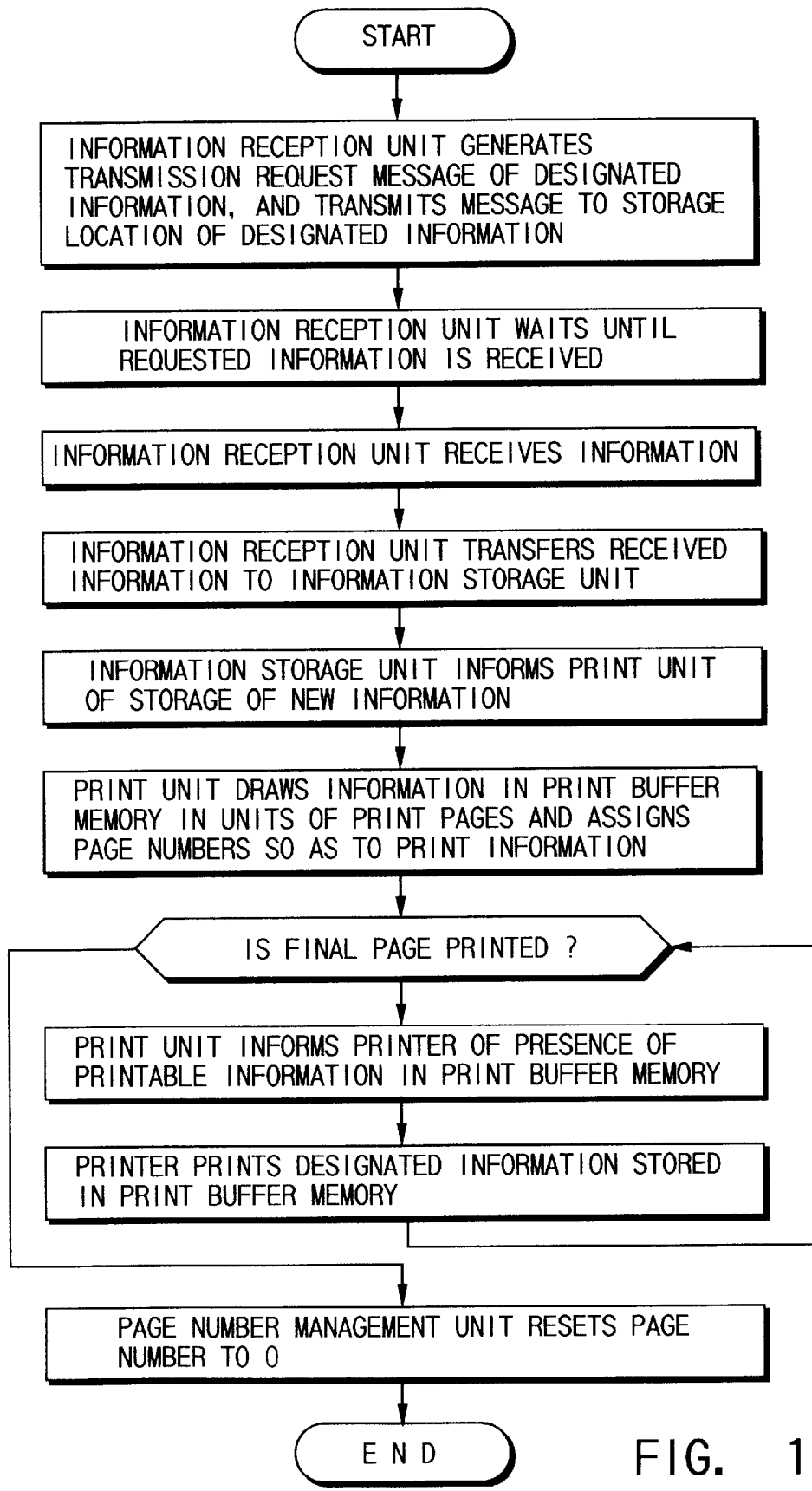
FIG. 15 is flow chart for explaining the digital document print operation in the conventional digital document print apparatus.

The hop count management in the information print apparatus of the present invention will be described below with reference to FIGS. 5, 13A and 13B. The hop count indicates the number (depth) of links to be tracked from the base document information, and the maximum hop count is managed by the link information management unit 3 together with the current hop count.

The user inputs first document information as base document information for the print operation, and a maximum hop count (ST30). The reception unit 5 requests transmission of the first document information to an external server that stores the first document information, and receives the first document information (ST31).

Upon reception of the first document information, the information reception unit 5 transfers the first document information to the information storage unit 2 (ST32). The information storage unit 2 temporarily stores the first document information, and informs the link information extraction unit 6 of reception of new document information (ST33).

The link information extraction unit 6 analyzes the stored first document information, extracts the name of another document information to which the first document information is linked as link information, and registers the link information in the link destination information management table 3a in the link information management unit 3, as shown in FIG. 6A (ST34).

Subsequently, the information reception unit 5 requests transmission of document information to the document information storage location of each link destination stored in the link destination information management table 3a in the link information management unit 3. When the unit 5 receives the requested information, it stores the received document information in the information storage unit 2 (ST35). The link information extraction unit 6 stores the current hop count in the link information management unit 3 together with the link destination information management table 3a (ST36).

The information reception unit 5 compares the current hop count and the maximum hop count in the link information management unit 3 (ST37). If the current hop count is smaller than the maximum hop count (YES in ST37), the flow returns to step ST34. In step ST34, document information which is also linked to the received document information is received, and its link information is registered, as shown in FIG. 6B.

If it is determined in step ST36 that the current hop count is equal to the maximum hop count, the link information extraction unit 6 instructs the print unit 4 to print all the pieces of received document information (ST38).

The subsequent processing is the same as that shown in FIG. 7. When the last page of document information that has reached by tracking links up to the maximum hop count is printed (ST41), the link destination information management table 3a associated with the document information is read out, and the contents of the table are printed as link destination list information (ST44). In this case, if this document information is linked to no document information, the link destination list information is not printed.

For example, as shown in FIG. 8, when a plurality of pieces of document information are linked to form a research report as a whole, and when the user designates "information 0" which serves as both the cover and the table of contents of this research report as base document information and also sets "2" in the maximum hop count, nine pieces of document information, i.e., information 0, information 1, information 2, information 3, information 4, information 5, information 6, information 7, and information 8 are printed out. More specifically, the document information of the cover & table contents of the research report, and the contents of "Summary" to "Conclusion" are simultaneously printed, and also, "Previous Research Record" (information 7) and "Research Diary, January 15" (information 8) are also printed. However, "Research Diary, Contents of January" (information 9) which is linked to "Research Diary, January 15" (information 8) is not printed since the hop count exceeds 2. In this case, after information 8 is printed, the document information name of information 9 is printed as link destination list information.

The table of contents print processing in the information print apparatus of the present invention will be described below.

Immediately after the designated base document information and a series of document information to which the base document information is linked are printed, the print unit 20 reads out the contents of the information print history management table 21a shown in FIG. 10, and writes the readout contents in the print buffer memory as a list. The printer 18 prints the list on a paper sheet.

Figures 12, 14:
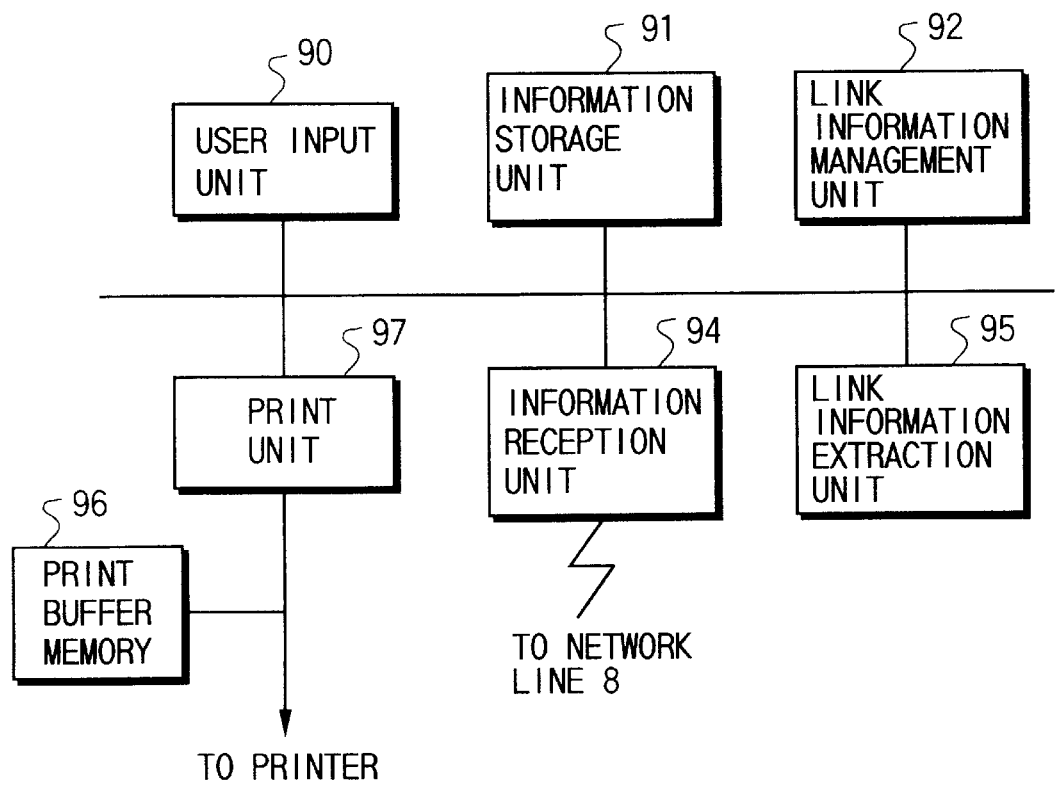
FIG. 12 is a view showing a print example of a list.
FIG. 14 is a block diagram showing the module arrangement associated with a conventional digital document print apparatus.

FIG. 12 shows a print example of the list, and base document information: information 0, information 1. . . page #10, information 2. . . page #15, information 3. . . page #19, total page count: 20 pages, and the like are printed as an information index.

As described above, according to the embodiments of the present invention, when hypermedia documents which are distributed on the network and are nonlinearly managed are to be printed, the user need not confirm document information to be printed, and can efficiently print required document information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of printing a plurality of pieces of document information related each other which are distributed to and stored in a plurality of storage means in predetermined units, comprising:

a step of designating a print operation of desired first document information;

a step of reading out the designated first document information from the corresponding storage means;

a step of searching for second document information which relates to the readout first document information;

a step of reading out the found second document information from the corresponding storage means;

a step of assigning information indicating a sequence between documents to the first document information and the second document information;

a first printing step of printing the first document information and the second document information together with the assigned information indicating the relationship in accordance with the information indicating the relationship; and a second printing step of inhibiting the second document information from being printed again and printing only the information indicating the relationship assigned to the second document information when the second document information was printed previously if the second document information already printed comes again to relate to the first document information while the first document information is being printed in the first printing step.

2. A method according to claim 1, wherein the step of assigning the information indicating the relationship between the documents includes a step of assigning serial page numbers to the first document information and the second document information, and the first printing step includes a step of printing the first document information and the second document information together with the assigned page numbers in an order of page numbers.

3. A method according to claim 1, wherein the second printing step includes a step of printing only the page number assigned to the second document information when the second document information was printed previously.

4. A method according to claim 1, wherein the searching step includes a step of specifying document information, which relates to the first document information, in the second document information, and the read-out step includes a step of reading out only the document information specified in the specifying step.

5. A method according to claim 1, wherein the document information stored in each of the plurality of storage means is assigned a right of access, and the first printing step includes the step of printing a message indicating that the first document information is assigned the right of access and cannot be read out.

6. A method according to claim 1, wherein the first printing step includes a step of printing a list of names of printed document information and the pages assigned thereto.

7. A method of printing a plurality of pieces of document information linked each other which are distributed to and stored in a plurality of storage means in predetermined units, comprising:

a step of designating a print operation of desired first document information and a maximum hop count indicating a maximum number of links to be tracked;

a step of reading out the designated first document information from the corresponding storage means;

a step of searching for second document information which is linked to the readout first document information;

a step of reading out the found second document information from the corresponding storage means;

a step of registering a current hop count;

a step of comparing the registered current hop count and the maximum hop count;

a step of reading out third document information which is linked to the found second document information from the corresponding storage means when the current hop count is smaller than the maximum hop count; and a step of printing the first document information and the second document information when the current hop count is equal to the maximum hop count.

8. A method according to claim 7, wherein the printing step includes a step of assigning serial page numbers to the first document information and the second document information, and a step of printing the first document information and the second document information together with the assigned page numbers in an order of page numbers.

9. A print apparatus for printing a plurality of pieces of document information linked each other which are distributed to and stored in a plurality of storage means in predetermined units, comprising:

designation means for designating a print operation of desired first document information;

first reception means for receiving the designated first document information from the corresponding storage means;

extraction means for extracting link information indicating second document information, which is linked to the first document information, from the received first document information;

second reception means for receiving the second document information indicated by the extracted link information from the corresponding storage means;

means for assigning serial page numbers to the first document information and the second document information;

means for printing the first document information and the second document information together with the page numbers; and means for inhibiting the second document information from being printed repeatedly and printing only the page number assigned to the second document information by the assigning means when the second information was printed previously, if the second document information already printed comes repeatedly to link to the first document information, while the first document information is being printed by the printing means.

10. An apparatus according to claim 9, wherein said extraction means includes means for specifying document information, which is linked to the first document information, in the second document information, and said second reception means includes means for receiving only the document information specified by said specifying means.

11. An apparatus according to claim 9, wherein said designation means includes means for designating a maximum hop count indicating a maximum number of links to be tracked, and said apparatus further includes means for registering a current hop count, means for reading out third document information which is linked to the extracted second document information when the current hop count is smaller than the maximum hop count, and means for printing the first document information and the second document information when the current hop count is equal to the maximum hop count.

* * * * *